（12）United States Patent
Blommesteijn

(10) Patent No.: US 10,331,690 B2
(45) Date of Patent: *Jun. 25, 2019

(54) METHOD FOR SORTING AND DISPLAYING DATA ON A PORTABLE ELECTRONIC DEVICE

(71) Applicant: BLACKBERRY LIMITED, Waterloo (CA)

(72) Inventor: Nicholas Blommesteijn, Ottawa (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 167 days.

This patent is subject to a terminal disclaimer.

(21) Appl. No.: 15/177,111

(22) Filed: Jun. 8, 2016

(65) Prior Publication Data

US 2016/0292239 A1 Oct. 6, 2016

Related U.S. Application Data

(63) Continuation of application No. 14/329,122, filed on Jul. 11, 2014, now Pat. No. 9,367,593, which is a
(Continued)

(51) Int. Cl.
*G06F 17/30* (2006.01)
*G06F 7/00* (2006.01)
(Continued)

(52) U.S. Cl.
CPC ............ *G06F 16/248* (2019.01); *G06F 16/29* (2019.01); *G06F 16/9537* (2019.01);
(Continued)

(58) Field of Classification Search
CPC ............... G06F 17/30241; G06F 17/30; G06F 17/3087; G06F 16/248; G06F 16/29;
(Continued)

(56) References Cited

U.S. PATENT DOCUMENTS 6,549,625 B1 * 4/2003 Rautila ................. G01S 5/0045
380/258
7,245,923 B2 * 7/2007 Frank ..................... G01C 21/20
342/357.66
(Continued)

OTHER PUBLICATIONS

Nicholas Blommesteijn, "Method for Sorting and Displaying Data on a Portable Electronic Device", U.S. Appl. No. 11/433,453, filed May 15, 2006. Now U.S. Pat. No. 8,161,031, issued Apr. 17, 2012.
(Continued)

Primary Examiner — Kuen S Lu
(74) Attorney, Agent, or Firm — Perry + Currier Inc.

(57) ABSTRACT

A method of sorting and displaying data on a portable electronic device includes: determining geographical coordinates of the portable electronic device, providing search criteria to the portable electronic device, performing a search in a database based on the search criteria resulting in a list of database records, determining a search area of the portable electronic device and displaying selected records from the list of database records on a display screen of the portable electronic device. Each of the selected records is located within a search radius, which originates at the geographical coordinates of the portable electronic device, and within the search area, which is determined based on a pointing direction of the portable electronic device.

16 Claims, 6 Drawing Sheets

Related U.S. Application Data continuation of application No. 13/420,806, filed on Mar. 15, 2012, now Pat. No. 8,788,478, which is a continuation of application No. 11/433,453, filed on May 15, 2006, now Pat. No. 8,161,031.

(51) Int. Cl.

| | |
|---|---|
| *G06F 16/248* | (2019.01) |
| *G06F 16/29* | (2019.01) |
| *G06F 16/9537* | (2019.01) |
| *H04M 1/725* | (2006.01) |
| *H04W 4/021* | (2018.01) |
| *H04W 4/02* | (2018.01) |

(52) U.S. Cl.
CPC ....... *H04M 1/72572* (2013.01); *H04W 4/022* (2013.01); *H04W 4/026* (2013.01)

(58) Field of Classification Search
CPC .......... G06F 16/9537; H04M 1/72572; H04W 1/022; H04W 1/026
USPC ...................................................... 707/708
See application file for complete search history.

(56) References Cited

U.S. PATENT DOCUMENTS

| | | | |
|---|---|---|---|
| 2002/0035430 A1* | 3/2002 | Yano | G01C 21/3415 701/411 |
| 2002/0059030 A1* | 5/2002 | Otworth | A61B 5/411 702/19 |
| 2002/0196280 A1* | 12/2002 | Bassett | G06Q 10/109 715/751 |
| 2003/0167121 A1* | 9/2003 | Ockerse | G01C 17/30 701/530 |
| 2004/0203900 A1* | 10/2004 | Cedervall | H04L 29/06 455/456.1 |
| 2006/0293850 A1* | 12/2006 | Ahn | G01C 21/3415 701/469 |
| 2007/0143260 A1* | 6/2007 | Markov | G06Q 30/02 |

OTHER PUBLICATIONS

Nicholas Blommesteijn, "Method for Sorting and Displaying Data on a Portable Electronic Device", U.S. Appl. No. 13/420,806, filed Mar. 15, 2012. Now U.S. Pat. No. 8,788,478, issued Jul. 22, 2014.
Nicholas Blommesteijn, "Method for Sorting and Displaying Data on a Portable Electronic Device", U.S. Appl. No. 14/329,122, filed Jul. 11, 2014. Now U.S. Pat. No. 9,367,593, issued Jun. 14, 2016.

\* cited by examiner

METHOD FOR SORTING AND DISPLAYING DATA ON A PORTABLE ELECTRONIC DEVICE

CROSS-REFERENCE TO RELATED APPLICATIONS

This application is a continuation application of U.S. patent application Ser. No. 14/329,122, filed Jul. 11, 2014 now U.S. Pat. No. 9,367,593, which itself is a continuation application of U.S. patent application Ser. No. 13/420,806, filed Mar. 15, 2012, now U.S. Pat. No. 8,788,478, which a continuation application of U.S. patent application Ser. No. 11/433,453, filed May 15, 2006, now U.S. Pat. No. 8,161,031.

FIELD

The present disclosure relates to a portable electronic device, in particular, a method for sorting and displaying data on the portable electronic device.

BACKGROUND

It is becoming increasingly common to use resources available through the Internet to search for phone numbers, directions or other information that is associated with a geographical location. Websites such as canada411™, 411.ca™, MapQuest™ and Google™, for example, are very popular and many other websites offering similar services are also available.

The number of searchable fields on most websites is quite limited, however, and in some cases performing a search using a website may not be much quicker than performing a manual search using a telephone directory or a map. For example, when searching for a person or business having a common name, multiple pages of results must be viewed before the correct person or business is located. Similarly, using online maps can be quite slow particularly if a user has limited information about their desired location.

BRIEF DESCRIPTION OF THE DRAWINGS

The embodiments will be better understood with reference to the following Figures in which like numerals denote like parts and in which.

DETAILED DESCRIPTION

There is disclosed herein a method of sorting and displaying data on a portable electronic device including: determining geographical coordinates of the portable electronic device, providing search criteria to the portable electronic device, the search criteria including a search radius, the search radius originating at the geographical coordinates of the portable electronic device, sending the search criteria to a server, performing a search in a database based on the search criteria, the search resulting in a list of database records, returning the list of database records to the portable electronic device, determining a search area of the portable electronic device, displaying selected records from the list of database records on a display screen of the portable electronic device, the selected database records having geographic coordinates located within the search area and wherein the search area is determined based on a pointing direction of the portable electronic device.

There is further disclosed herein a portable electronic device including positioning system hardware for determining geographical coordinates of the portable electronic device, magnetic sensor hardware for determining a pointing direction of the portable electronic device, a processor for performing a search in a records database, the search being performed based on search criteria and a screen for displaying records meeting the search criteria. The search criteria includes a search area defined at least in part by a search radius having an origin at the geographical coordinates of the portable electronic device.

Figure 1:
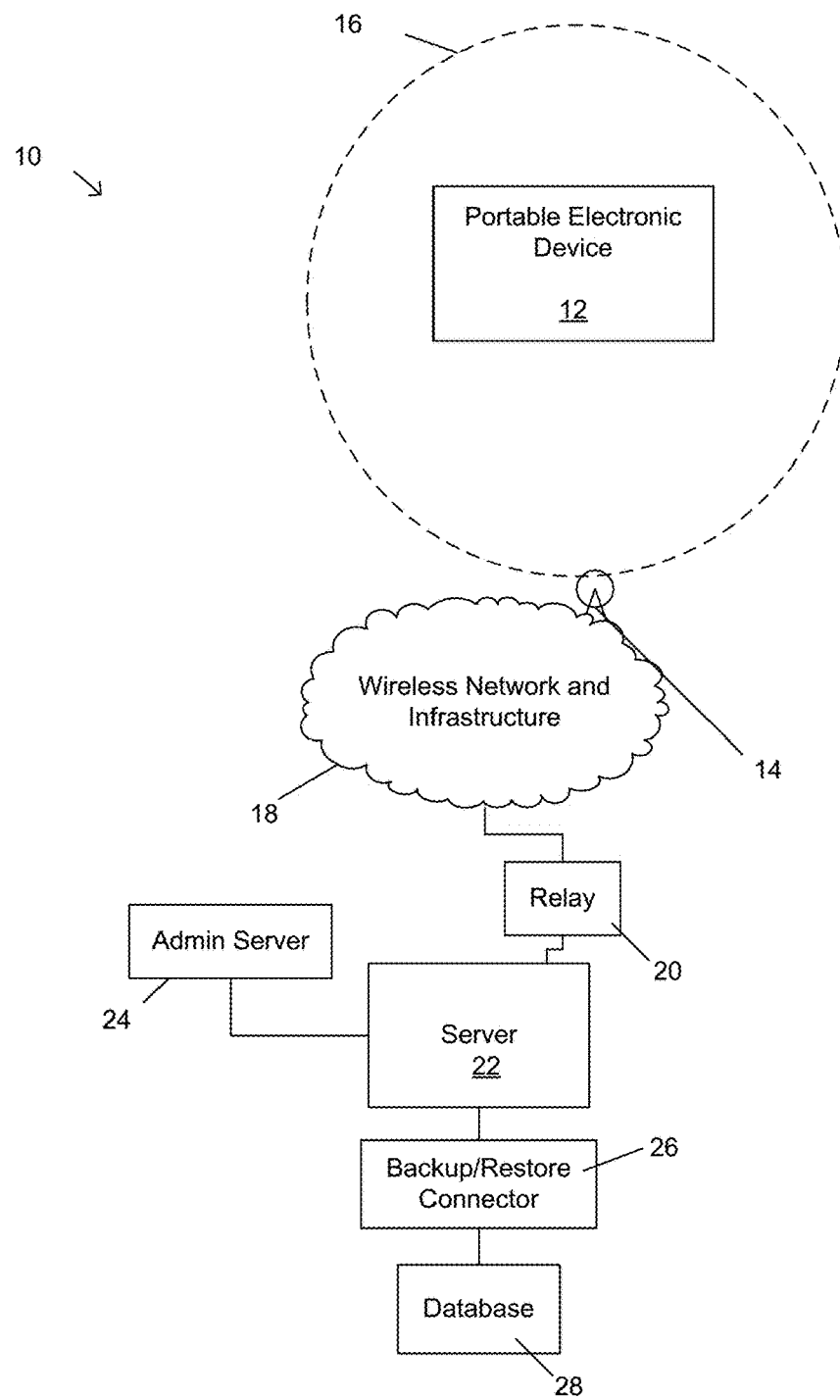
FIG. 1 is a functional block diagram of a communication system for a portable electronic device according to an embodiment.

Referring now to FIG. 1, a functional block diagram of a communication system 10 and a portable electronic device 12 is generally shown. The portable electronic device 12 and the communication system 10 are operable to effect communications over a radio communications channel therebetween.

For the purpose of illustration, the communication system 10 is functionally represented in FIG. 1 and includes a base station 14. Base station 14 defines a coverage area, or cell 16 within which communications between the base station 14 and the portable electronic device 12 can be effected. It will be appreciated that the portable electronic device 12 is movable within cell 16 and can be moved to coverage areas defined by other cells, including those that are not illustrated in the present example.

The base station 14 is part of a wireless network and infrastructure 18 that provides a link to the portable electronic device 12. The wireless network and infrastructure 18 includes additional base stations (not shown) that provide the other cells referred to above. Data is delivered to the portable electronic device 12 via wireless transmission from base station 14. Similarly, data is sent from the portable electronic device 12 via wireless transmission to the base station 14.

Wireless networks and infrastructures include, for example, data-centric wireless networks, voice-centric wireless networks, or dual-mode wireless networks. For the purpose of the present exemplary embodiment, the wireless network and infrastructure 18 includes a dual-mode wireless network that supports both voice and data communications over the same physical base stations.

The communication system 10 further includes a relay device 20 that is connected to the wireless network and infrastructure 18 and to a server 22. It will be understood that the functions provided by the relay device 20 and the server 22 can be embodied in the same device. The server 22 is also connected to an administration server 24, as shown. The administration server 24 provides administrative services to and control over the server 22.

The server 22 is also functionally coupled through a connector 26 to a backup/restore database 28. Other connectors and databases can be provided, for example, for synchronization purposes. The connector 26 receives commands from the server 22. It will be understood that the connector 26 is a functional component and can be provided by way of an application on the server 22. The backup/restore database 28 is used for storing data records, including, for example, copies of Short Message Service (SMS) or Personal Identification Number (PIN) messages sent from the portable electronic device 12.

Figure 2:
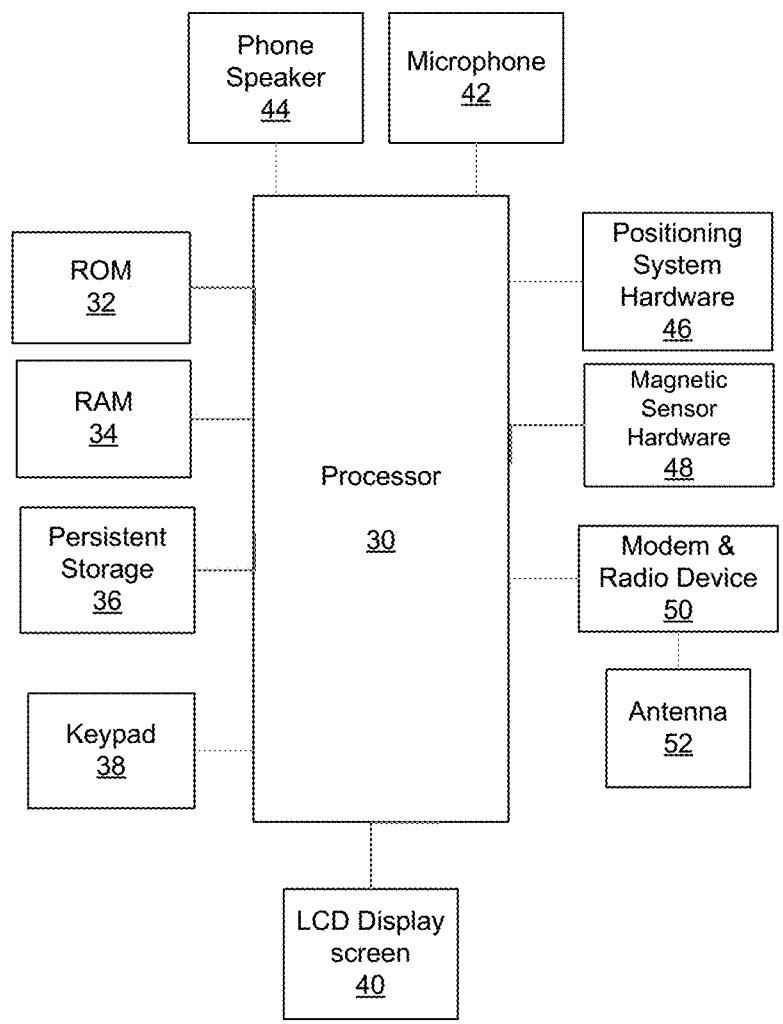
FIG. 2 is a functional block diagram of certain components the portable electronic device of FIG. 1.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to a wireless personal digital assistant. Other portable electronic devices are possible, such as cellular telephones, smart telephones, and laptop computers. Referring again to the present embodiment, the portable electronic device 12 is based on a microcomputer including a processor 30 connected to a read-only-memory (ROM) 32 that contains a plurality of applications executable by the processor 30 that enables the portable electronic device 12 to perform certain functions including, for example, PIN message functions, SMS message functions and cellular telephone functions. The processor 30 is also connected to a random access memory unit (RAM) 34 and a persistent storage device 36 which are responsible for various non-volatile storage functions of the portable electronic device 12. The processor 30 receives input from various input devices including a keypad 38. The processor 30 outputs to various output devices including an LCD display screen 40. A microphone 42 and phone speaker 44 are connected to the processor 30 for cellular telephone functions. The processor 30 is also connected to positioning system hardware 46, magnetic sensor hardware 48 and a modem and radio device 50. The modem and radio device 50 is used to connect to wireless networks using an antenna 52. The modem and radio device 50 transmits and receives voice and data communications to and from the portable electronic device 12 through the antenna 52.

The portable electronic device 12 is operable to effect two way communication of voice and data. Thus, the portable electronic device 12 transmits and receives voice and data communications over the wireless network and infrastructure 18 via wireless communications with the base station 14 over a radio communications channel.

Figure 3:
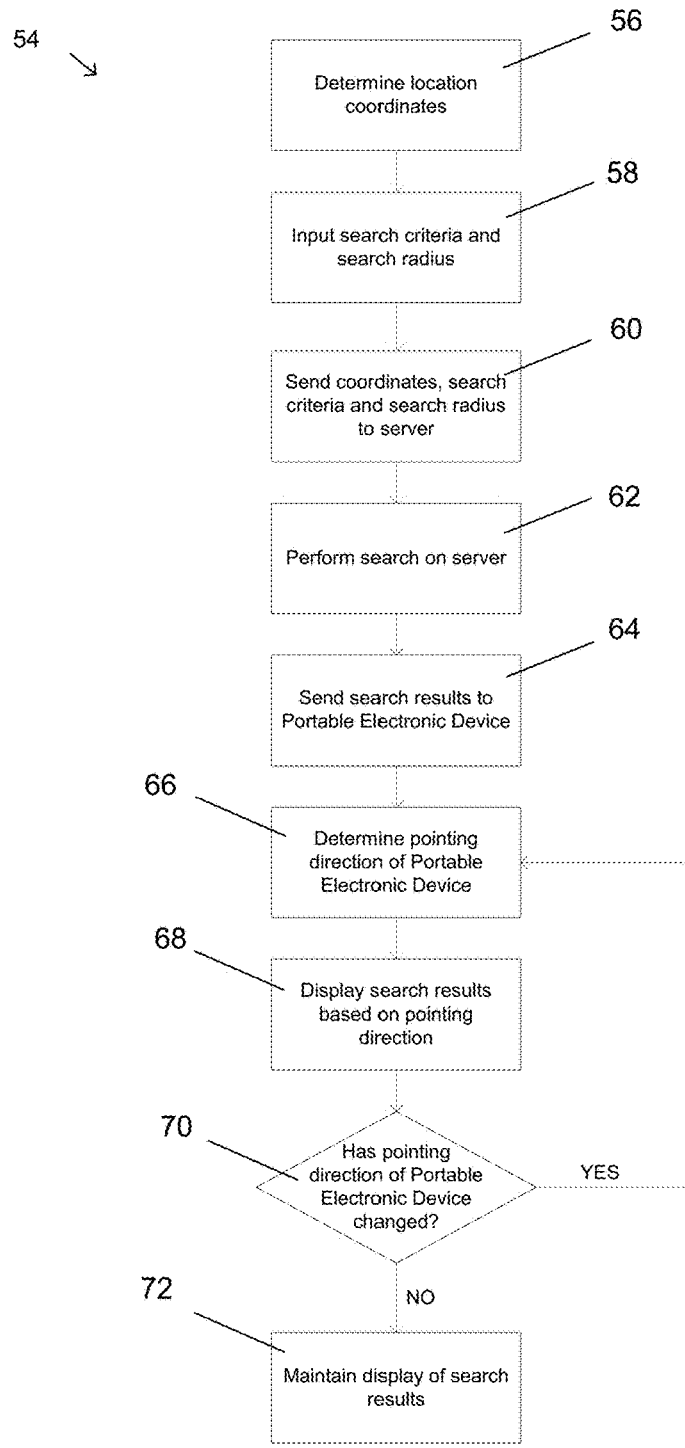
FIG. 3 is a flowchart showing operation of an embodiment of a sorting system for the portable electronic device of FIG. 2.
Figure 4:
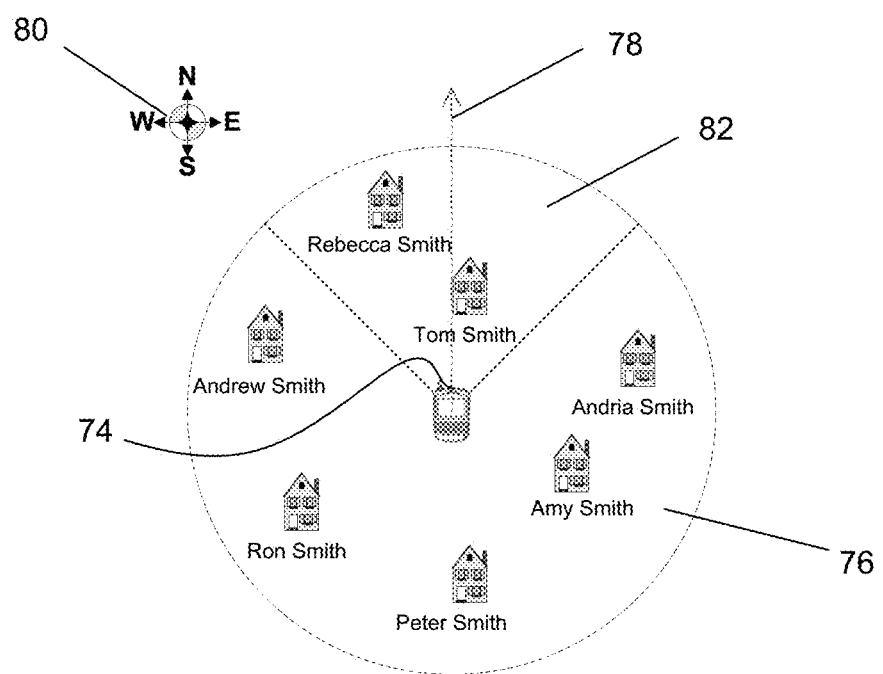
FIG. 4 is a schematic overhead view of the portable electronic device of FIG. 2.
Figure 5:
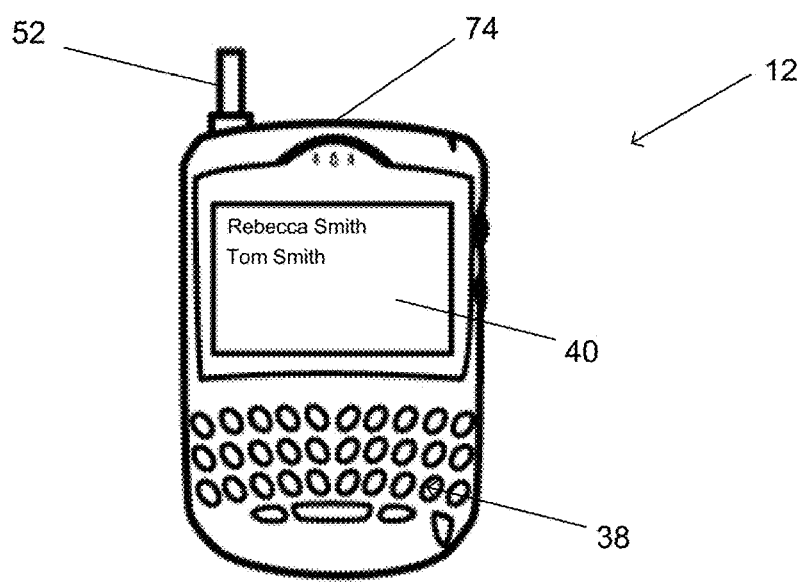
FIG. 5 is a front view of the portable electronic device of FIG. 2.

Referring to FIGS. 3, 4 and 5, operation of a sorting system 54 for the portable electronic device 12 is generally shown. The geographical location of the portable electronic device 12 is first determined at step 56 by a receiver (not shown), which is included in the positioning system hardware 46. The receiver uses Global Positioning System (GPS) or Assisted GPS technology to determine the geographical location coordinates of the portable electronic device 12 in a manner that is well known in the art and therefore will not be described further here. The geographical location coordinates may alternatively be determined using another suitable type of positioning technology, such as signal strength from base stations, for example.

At step 58, a user inputs search criteria and a search radius into the portable electronic device 12. This is generally performed using the keypad 38, however, another input means, such as a touch sensitive screen having character recognition capability, for example, may be used. Types of search criteria include a last name for a telephone number search or a category such as "restaurants" or "medical clinics", for example. As shown in FIG. 4, the search radius that is input by the user is measured from the geographical location of the portable electronic device 12 and defines a circular area 76 within which the search is conducted. The user may set the search radius to a default value in order to avoid having to input this value every time a search is performed. It will be appreciated that step 58 may be performed before, after or at the same time as step 56.

At step 60, the geographical location coordinates of the portable electronic device 12, the search criteria and the search radius are sent to the server 22 through the wireless network and infrastructure 18, as previously described. A search is then performed by the server 22 in a records database, which includes records that are mapped to geographical locations, as indicated at step 62. The search results are then returned to the portable electronic device 12 at step 64.

The records database includes information relating to categories such as residences, businesses, government offices and/or landmarks, for example. A record for a restaurant may include: the name of the restaurant, the address of the restaurant, the phone number of the restaurant, the type of food served, and the geographical location coordinates associated with the restaurant. Records databases that are suitable for use with the present embodiment may be licensed from several different companies, including Navteq™, for example.

In the present embodiment, the server 22 is in communication with at least one records database. The records database may be a separate database or may be incorporated into the backup/restore database 28.

At step 66, a pointing direction 78 of a forward end 74 of the portable electronic device 12 is determined. The magnetic sensor hardware 48 includes an electronic compass (not shown) for providing the direction information. As shown in FIG. 4, the pointing direction 78 is north, as indicated by north arrow 80. The pointing direction 78 is used to define a search area within the circular area 76 for which results are desired. In this embodiment, the search area is a sector 82 of the circular area 76. The sector size is generally a default value, such as 45° on either side of the pointing direction, for example. The sector size may alternatively be specified by the user at the time of each new search.

In one embodiment, the electronic compass includes magnetic sensor HMC1041Z, which is manufactured by Honeywell. Other suitable magnetic sensors manufactured by Honeywell or other manufacturers may alternatively be used.

The search results are then displayed on the portable electronic device 12 based on the pointing direction 78, as indicated at step 68. In the example of FIGS. 4 and 5, a search was performed to retrieve records of persons having the last name "Smith". As shown in FIG. 4, the search results returned a total of seven records, however, only two records, specifically "Rebecca Smith" and "Tom Smith", are located within the sector 82. Therefore, as shown in FIG. 5, only those two records are displayed on the LCD display screen 40 for the user to view.

The magnetic sensor hardware 48 provides the portable electronic device 12 with continuous updates of the pointing direction 78. If the pointing direction 78 changes, as indicated at step 70, steps 66 and 68 are repeated as shown in FIG. 3. If a new search area, which is defined by a new pointing direction, does not include the locations of the records: "Rebecca Smith" and "Tom Smith", these records will no longer be displayed. Instead, records that are located within the new search area will be displayed. If the pointing direction 78 does not change, the original display will be maintained, as indicated at step 72.

Displaying results within a search area that is determined based on the pointing direction 78 of a user's portable electronic device 12 is particularly useful for a user who is driving down a one-way street or for a user who is on his/her way to another destination and wishes to find a restaurant, for example, that is on the way without having to backtrack. In addition, by knowing only the general direction in which a desired search result is located, a user is able to greatly reduce the number of hits returned by a search.

Figure 6:
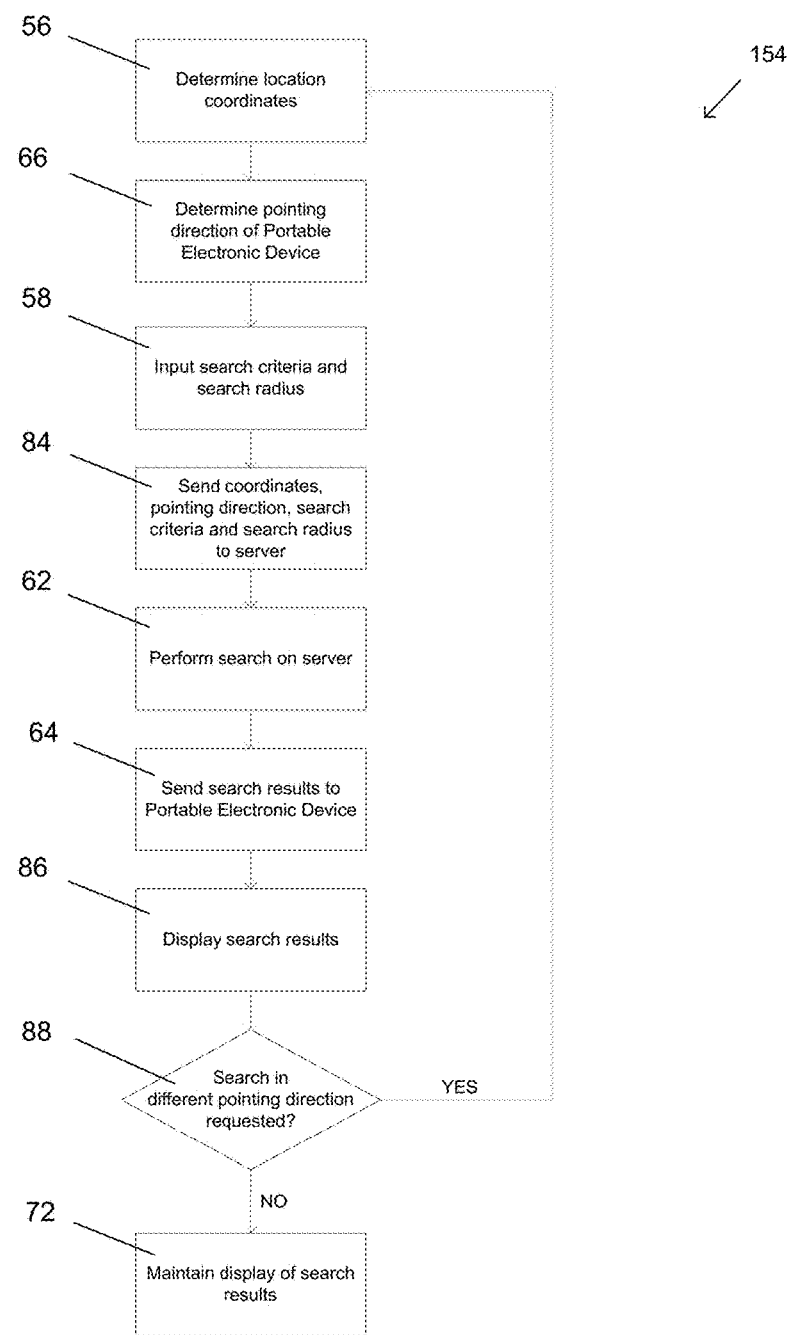
FIG. 6 is a flowchart showing operation of another embodiment of a sorting system for the portable electronic device of FIG. 2.

Operation of another embodiment of a sorting system 154 is shown in FIG. 6. This embodiment is similar to the embodiment of FIG. 3, however, the pointing direction 78, which is determined at step 66, is sent to the server 22 along with the geographical location coordinates, the search criteria and the search radius, as indicated at step 84. Thus, the search results that are returned to the portable electronic device 12 and then displayed at step 86 are limited to records that are located within the search area, which is defined by the pointing direction 78. If results from another search area are desired, as indicated at step 88, then a new search is performed starting at step 56, otherwise the results are maintained on the display screen 40, as indicated at step 72.

In another embodiment, the search area is a rectangle rather than a sector 82. As such, the width of the search area will remain constant as the distance from the portable electronic device 12 increases.

In yet another embodiment, the records database is stored locally on the portable electronic device 12. Therefore, no data is sent to or from the server 22 and the search is performed locally on the portable electronic device 12. Once the search has been completed, the results are displayed on the screen 40 for the user to view.

A specific embodiment has been shown and described herein. However, modifications and variations may occur to those skilled in the art. For example, the shape of the search area is not limited to being a sector or a rectangle, any suitable shape may be used. All such modifications and variations are believed to be within the sphere and scope of the present embodiment.

What is claimed is:

1. A method comprising:
   at a device comprising a processor, a sensor for determining a pointing direction of the device comprising a pointing direction of a forward end of the device, a display and a radio interface, determining geographical coordinates of the device;
   sending, using the radio interface, a search request to a server;
   receiving, using the radio interface, from the server, a plurality of database records indicative of a search of a database based on the search request and an area defined by a radius extending from the geographical coordinates;
   determining, using the sensor, a pointing direction of the device;
   determining, at the processor, a search area within the area based on the pointing direction of the device;
   at the processor, selecting a subset of the plurality of database records, each database record in the subset associated with coordinates within the search area, wherein a remainder of the plurality of database records are associated with coordinates within the area and outside the search area; and
   rendering, at the display, the subset of the plurality of database records without rendering the remainder of the plurality of database records.

2. The method of claim 1, wherein the search request comprises the pointing direction and the plurality of database records are indicative of the search of the database based on the search request, the radius extending from the geographical coordinates, and the pointing direction.

3. The method of claim 1, wherein the search request comprises one or more of: input received at the device; geographical coordinates of the device; at least one search parameter; a category of the plurality of database records; and a representation of one or more of a name, a telephone number, a location category, a type of food, an address, a residence, a business, a medical clinic, a government office, and a landmark.

4. The method of claim 1, further comprising rendering, at the display, the one or more of the plurality of database records having the respective geographical coordinates located within the search area on a map.

5. The method of claim 1, further comprising, when the pointing direction changes:
   determining an updated search area within the area based on a changed pointing direction; and,
   rendering, at the display, one or more of the plurality of database records having the respective geographical coordinates located within the updated search area.

6. The method of claim 1, wherein the area comprises a circle defined by the radius and the search area comprises a sector of the circle.

7. The method of claim 1, wherein the search area comprises a rectangle.

8. A device comprising:
   a processor, a sensor for determining a pointing direction of the device comprising a pointing direction of a forward end of the device, a display and a radio device, the processor configured to:
   determine geographical coordinates of a device;
   send, using the radio interface, a search request to a server;
   receive, using the radio interface, from the server, a plurality of database records indicative of a search of a database based on the search request and an area defined by a radius extending from the geographical coordinates;
   determine, using the sensor, a pointing direction of the device;
   determine a search area within the area based on the pointing direction of the device;
   select a subset of the plurality of database records, each database record in the subset associated with coordinates within the search area, wherein a remainder of the plurality of database records are associated with coordinates within the area and outside the search area; and
   render, at the display, the subset of the plurality of database records without rendering the remainder of the plurality of database records.

9. The device of claim 8, wherein the search request comprises the pointing direction and the plurality of database records are indicative of the search of the database based on the search request, the radius extending from the geographical coordinates, and the pointing direction.

10. The device of claim 8, wherein the search request comprises one or more of: input received at the device; geographical coordinates of the device; at least one search parameter; a category of the plurality of database records; and a representation of one or more of a name, a telephone number, a location category, a type of food, an address, a residence, a business, a medical clinic, a government office, and a landmark.

11. The device of claim 8, wherein the processor is further configured to render, at the display, the one or more of the plurality of database records having the respective geographical coordinates located within the search area on a map.

12. The device of claim 8, wherein the processor is further configured to, when the pointing direction changes:
   determine an updated search area within the area based on a changed pointing direction; and,
   render, at the display, one or more of the plurality of database records having the respective geographical coordinates located within the updated search area.

13. The device of claim 8, wherein the area is circle and the search area comprises a sector of the circle.

14. The device of claim 8, wherein the search area comprises a rectangle.

15. The device of claim 8, wherein the sensor comprises an electronic compass.

16. A non-transitory computer-readable medium storing a computer program, wherein execution of the computer program is for:
   at a device comprising a processor, a sensor for determining a pointing direction of the device comprising a pointing direction of a forward end of the device, a display and a radio interface, determining geographical coordinates of the device;
   sending, using the radio interface, a search request to a server;
   receiving, using the radio interface, from the server, a plurality of database records indicative of a search of a database based on the search request and an area defined by a radius extending from the geographical coordinates;
   determining, using the sensor, a pointing direction of the device;
   determining, at the processor, a search area within the area based on the pointing direction of the device;
   at the processor, selecting a subset of the plurality of database records, each database record in the subset associated with coordinates within the search area, wherein a remainder of the plurality of database records are associated with coordinates within the area and outside the search area; and
   rendering, at the display, the subset of the plurality of database records without rendering the remainder of the plurality of database records.

* * * * *